United States Patent Office 3,277,163
Patented Oct. 4, 1966

3,277,163
PROCESS FOR PREPARING BIS-HYDROXYALKYL-SULFONES AND β-HYDROXYALKYLSULFONIC ACID SALTS
Karl Waldmann, Frankfurt am Main, Germany, assignor to Farbwerke Hoechst Aktiengesellschaft vormals Meister Lucius & Brüning, Frankfurt am Main, Germany, a corporation of Germany
No Drawing. Filed Apr. 30, 1963, Ser. No. 277,011
Claims priority, application Germany, May 2, 1962, F 36,692
7 Claims. (Cl. 260—513)

The present invention relates to a process for preparing bis-hydroxyalkylsulfone and β-hydroxyalkylsulfonic acid salts.

We have found that bis-hydroxyalkylsulfone and β-hydroxyalkylsulfonic acid salts can be obtained in equimolar amounts of reacting compounds which contain epoxide groups, especially ethylene oxide, with salts of dithionic acid in the alkaline pH-range. It is assumed that the reaction follows the following scheme which illustrates the reaction with ethylene oxide:

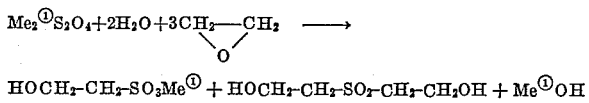

$HOCH_2-CH_2-SO_3Me^\oplus + HOCH_2-CH_2-SO_2-CH_2-CH_2OH + Me^\oplus OH$

The reaction of the epoxide groups-containing compounds with the dithionite, besides the sodium salt also other dithionic acid salts may be used, for example $K_2S_2O_4$ or $ZnS_2O_4$, is advantageously carried out by introducing ethylene oxide or the epoxide groups-containing compound at a temperature in the range of about 0° C. and about 100° C. in a preferably concentrated aqueous solution of the dithionite. The alkalinity which increases during the reaction is diminished by the addition of a dilute acid, for example, dilute nitric acid, sulfurous acid, carbonic acid, preferably dilute sulfuric acid, this diminution of alkalinity being effected in a manner that a pH-value of about 7.5 to about 9.5 is maintained during the reaction. When the reaction is complete, the reaction solution is neutralized; if sodium dithionite, ethylene oxide and dilute sulfuric acid are used, there is obtained an equimolar solution of $HOCH_2—CH_2SO_3Na$, $HOCH_2—CH_2SO_2CH_2—CH_2OH$, and sodium sulfate.

The solution thus obtained can be worked up according to known methods and separated into the individual components. In most cases the water or the solvents will be distilled off and the residue will then be treated with a more appropriate solvent. Thus, β,β'-dihydroxy-dialkylsulfone can be extracted from the evaporation residue, for example, by means of dioxane or isopropanol. Alternatively, the aqueous solution may also be passed through suitable ion exchangers. The way chosen for isolating one or several reaction products depends, of course, on the use for which the products are intended and on the solubility properties of the products formed.

The compounds obtained by the process of the present invention correspond in general to the formulae, R—CHOH—CH$_2$—SO$_2$—CH$_2$—CHOH—R'
and
R—CHOH—CH$_2$—SO$_3^-$Cation$^+$ in which R and R' represent radicals which correspond to the alkylene oxide used, thus in the case of ethylene oxide, to hydrogen atoms. As epoxide-groups-containing compounds, there may be used, for example, 1,2-propyleneoxide, glycidol, phenoxypropene oxide, 1,2- or 2,3-epoxy butane, cyclohexene oxide, and, if desired, compounds which contain several epoxide groups, for example, butadiene dioxide, and preferably ethylene oxide.

The hydroxyalkylsulfones and hydroxyalkylsulfonates can be used as textile auxiliary agents or as intermediate products.

The following examples illustrate the invention, but they are not intended to limit it thereto, the parts indicated being by weight unless otherwise stated.

Example 1

174 parts of sodium dithionite having a strength of about 90% were stirred with 220 parts of water. Ethylene oxide was then introduced into this suspension of dithionite dihydrate, starting at room temperature, and 5 N-sulfuric acid was simultaneously dropped in at such a rate that the pH-value was kept at 8.5 to 9.5. The temperature soon rose to 60° C.–70° C. and was maintained in this range at the beginning by cooling and at the end by heating. After 4 hours, 210 parts of 5 N-sulfuric acid had been consumed. The reaction mixture was then evaporated to dryness under reduced pressure and the crystal magma was extracted several times with hot dioxane. After removal of the dioxane by distillation, about 110 parts of β,β'-dihydroxy-diethylsulfone melting at 50° C. were obtained.

The crystal magma which showed to be insoluble in dioxane contained in addition to sodium sulfate about 130 parts of sodium salt of hydroxyethanesulfonic acid which could be separated from sodium sulfate by extraction with methanol.

Example 2

87 parts of sodium dithionite having a strength of about 90% were introduced into a mixture of 150 parts of water and 120 parts of methanol. After addition of 87 parts of 1,2-propylene oxide the mixture was heated to the temperature at which the propylene was just kept boiling with reflux. The alkalinity of the alkali liberated during the reaction was reduced by dropwise adding 5.65 N-sulfuric acid so that a mean pH-value of 8.2–8.8 was maintained. After about 15 hours the mixture was neutralized and evaporated under reduced pressure. The residue was stirred with 300 parts of isopropanol and then filtered. After drying, the residue contained the sodium salt of β-hydroxypropane sulfonic acid in addition to sodium sulfate. After elimination of the isopropanol by distillation, 61 parts of β,β' - dihydroxypropylsulfone (CH$_3$—CHOH—CH$_2$—SO$_2$—CH$_2$—CHOH—CH$_3$)

in the form of a non-crystallizing colorless oil, were obtained.

Example 3

36 parts of sodium dithionite having a strength of about 90% were dissolved in 140 parts of water under an atmosphere of nitrogen. A solution of 90 parts of γ-phenoxypropene oxide in 50 parts of methanol was added thereto and the reaction mixture was heated to 70° C. 5.65 N-sulfuric acid was added dropwise in such a manner that the pH-value was kept at 8.2–8.8. After 14 hours, 30 parts of phenoxypropene oxide were added and after further 6 hours the whole was cooled and neutralized. The precipitate formed was dissolved in ethyl acetate and a small amount of water, both layers were separated and evaporated. 48 g. of sodium salt of γ-phenoxy-β-hydroxypropanesulfonic acid were obtained from the aqueous phase in addition to 10 parts of sodium sulfate, while after concentration of the ethyl acetate phase, 45 parts of bis-(phenoxy-hydroxypropyl)-sulfone corresponding to the formula

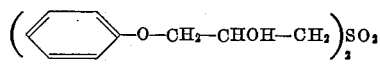

melting at 124° C. crystallized out.

We claim:
1. The process for preparing bis-hydroxyalkylsulfones and β-hydroxyalkylsulfonic acid salts, which comprises reacting (1) a compound containing at least one epoxide group with (2) a salt of dithionic acid in an alkaline pH-range, at a temperature of from about 0° C. to about 100° C. and in an aqueous medium.
2. A process as claimed in claim 1, wherein ethylene oxide is used as compound containing an epoxide group.
3. A process as claimed in claim 1, wherein the sodium salt of dithionic acid is used as the dithionic acid salt.
4. A process as claimed in claim 1, wherein the potassium salt of dithionic acid is used as the dithionic acid salt.
5. A process as claimed in claim 1, wherein the zinc salt of dithionic acid is used as the dithionic acid salt.
6. A process as claimed in claim 1, wherein the reaction is carried out in a concentrated aqueous solution of said dithionic acid salt.
7. A process as claimed in claim 1, wherein the reaction is carried out in a pH-range from about 7.5 to about 9.5.

References Cited by the Examiner

UNITED STATES PATENTS 2,485,271  10/1949  Frederick _____ 260—537

OTHER REFERENCES

Houben-Weyl: Methoden der Organischen Chemie, vol. 9, 1955, pp. 378.

LORRAINE A. WEINBERGER, *Primary Examiner.*

LEON ZITVER, *Examiner.*

B. EISEN, M. WEBSTER, *Assistant Examiners.*